United States Patent [19]

Hayashi

[11] 4,178,147

[45] * Dec. 11, 1979

[54] STRETCHER OF DOUGH FOR CAKES, BREAD AND THE LIKE

[76] Inventor: Torahiko Hayashi, 2-3 Nozawa-machi, Utsunomiya-shi, Tochigi-ken, Japan

[ * ] Notice: The portion of the term of this patent subsequent to Aug. 10, 1993, has been disclaimed.

[21] Appl. No.: 762,319

[22] Filed: Jan. 25, 1977

[30] Foreign Application Priority Data

Jan. 27, 1976 [JP] Japan .................................. 51-7648

[51] Int. Cl.² .............................................. A21C 3/02
[52] U.S. Cl. .................................... 425/372; 425/337; 425/363;
[58] Field of Search .............. 425/363, 372, 373, 335, 425/337, 455

[56] References Cited

U.S. PATENT DOCUMENTS

| | | | |
|---|---|---|---|
| 1,134,970 | 4/1915 | Lawrence | 425/337 |
| 2,069,496 | 2/1937 | Kessler | 72/190 |
| 2,157,192 | 5/1939 | Thurlings | 425/335 |
| 2,275,714 | 3/1942 | Anetsberger et al. | 425/363 X |
| 2,684,000 | 7/1954 | Holtz | 72/190 |
| 2,978,933 | 4/1961 | Sendzimir | 72/190 |
| 3,023,714 | 3/1962 | Seewer | 425/363 X |
| 3,191,553 | 6/1965 | Rich et al. | 425/455 X |
| 3,476,058 | 11/1969 | Watkin et al. | 425/363 X |
| 3,748,073 | 7/1973 | Lankford | 425/367 X |
| 3,973,895 | 8/1976 | Hayashi | 425/372 |

FOREIGN PATENT DOCUMENTS 272994 7/1969 Fed. Rep. of Germany ........... 425/372

Primary Examiner—William R. Briggs
Attorney, Agent, or Firm—Guy W. Shoup; Gerard F. Dunne

[57] ABSTRACT

An apparatus for continuously stretching dough for cakes, bread and the like, comprising a plurality of freely rotatable stretching rollers progressing along a closed orbit comprising a lower straight portion, and a dough transport device positioned thereunder and facing the lower straight portion of the orbit leaving a space between the stretching rollers progressing on the lower straight portion of the orbit and the upper surface of the dough transport device sufficient to permit the pass of dough to be stretched, the dough transport device comprising at least a portion of an intake belt conveyor and one or more positively driven transport rollers disposed in series downstream of the intake conveyor, with or without at least a portion of a further downstream belt conveyor.

6 Claims, 5 Drawing Figures

STRETCHER OF DOUGH FOR CAKES, BREAD AND THE LIKE

The present invention relates to an apparatus for continuously stretching dough material such as cake dough, bread dough and the like into a thin web.

In the past, the continuous stretching of dough for cakes, bread and the like using a mechanical device has been generally carried out by means of a pair of rollers provided at fixed positions and rotatable in opposite directions. In this device, the dough is stretched by compression. When this device is used for stretching dough for cakes or bread, the dough tends to stick to the rollers or the tissue or the inherent nature of the dough is destroyed. Thus, it is not possible to stretch dough in one operation to a thickness substantially smaller than, for instance one tenth or less of the original thickness. Therefore, multiple pairs of rollers must be employed in series to obtain a sufficiently thin dough sheet. However, since the compression of the dough by the rollers of this device tends to destroy the tissue of the dough subjected to the stretching operation, it is likely that the repetition of compression increases the destruction of the tissue. In order to minimize the destruction of the tissue, the compression should be minimized, thus resulting in the demand for a large number of pairs of rollers, decreasing substantially the stretching efficiency of the device.

The inventor of the present invention earlier invented a device as disclosed in U.S. Pat. No. 3,973,895, issued Aug. 10, 1976, wherein a strip of dough material is fed into and flattened in a path formed between a group of planetary rollers, which are arranged to revolve on an oval-shaped orbit and to rotate on their own respective axes, and a plurality of moving conveyor belts positioned underneath a lower straight portion of said orbit. In the above device, the speed of each of said conveyor belts is faster than that of the nearest upstream conveyor. The rollers progressing at said straight portion of said orbit progress in the same direction as the movement of said conveyor belts and the rotational speed of the rollers are positively controlled at the area of said straight portion by means connected to a frame or base of the device.

The appratus of the present invention is an improvement over the above device. The present invention concerns itself with an apparatus for continuously stretching dough for cakes, bread and the like comprising a base; stretching roller means having a plurality of freely rotatable stretching rollers positioned on said base so as to revolve along an oval path having a lower straight portion; dough transport means arranged below said stretching roller means and facing the lower straight portion of said oval path leaving a space between said stretching rollers progressing on said lower straight portion and the upper surface of said dough transport means sufficient to permit the pass of dough to be stretched; drive means to move said dough transport means relative to said base; drive means mounted on said base to progress said stretching rollers in the same direction as the movement of said dough transport means at the area where said stretching rollers progress opposite to said dough transport means, characterized in that said dough transport means comprises at least a portion of an intake belt conveyor to which said dough is to be fed and one or more positively driven transport rollers disposed in series downstream of said intake conveyor, the peripheral speed of rotation of each said downstream transport roller being faster than that of the nearest upstream transport roller or the speed of movement of the intake belt conveyor, the speed of revolution of said stretching rollers being faster than the peripheral speed of rotation of any of said transport rollers.

As above-mentioned, the device of the inventor's prior invention is provided with a conveyor or conveyors, not a roller or rollers, disposed subsequent to the intake conveyor.

When the conveyors subsequent to the intake conveyor are replaced by a plurality of rollers, the rollers stretch dough more effectively than the conveyor especially when the desired thickness of the dough sheet is about 3 mm or larger. The velocity of each roller may be varied such that it increases in the downstream direction. Each roller coacts with the fast-running planetary rollers thereabove to pull dough forward creating tension in the dough. Thus, the dough is stretched at each roller. This makes it possible to stretch dough to a greater extent than the case conveyors are employed.

A further advantage is obtained by the use of rollers instead of belt conveyors in that the fabrication of the device is substantially simplified, thus saving cost and labor and enabling to provide a more sturdy device.

Even when only a single roller is to replace a belt conveyor, a dough sheet of a similar thickness may be obtained with a substantially simpler mechanism.

The use of rollers eliminates possibilities of the dough sticking to the device as in the case where belt conveyors are used.

When one or a plurality of rollers are to be added to the device consisting of two or more belt conveyors for transferring dough sheet, namely, when one or a plurality of rollers are added to the device of the inventor's prior invention between the intake belt conveyor and the subsequent belt conveyor or conveyors, the effect of stretching by the device is substantially increased by the effective stretching action of the rollers.

Thus, an object of the present invention is to provide a stretching device of dough for cakes, bread and the like with a high stretching efficiency.

The above and other objects, features and advantages of the invention will be apparent in the undermentioned detailed description.

For a better understanding of the invention, reference will now be made by way of example to the accompanying drawings, in which.

Figure 1:
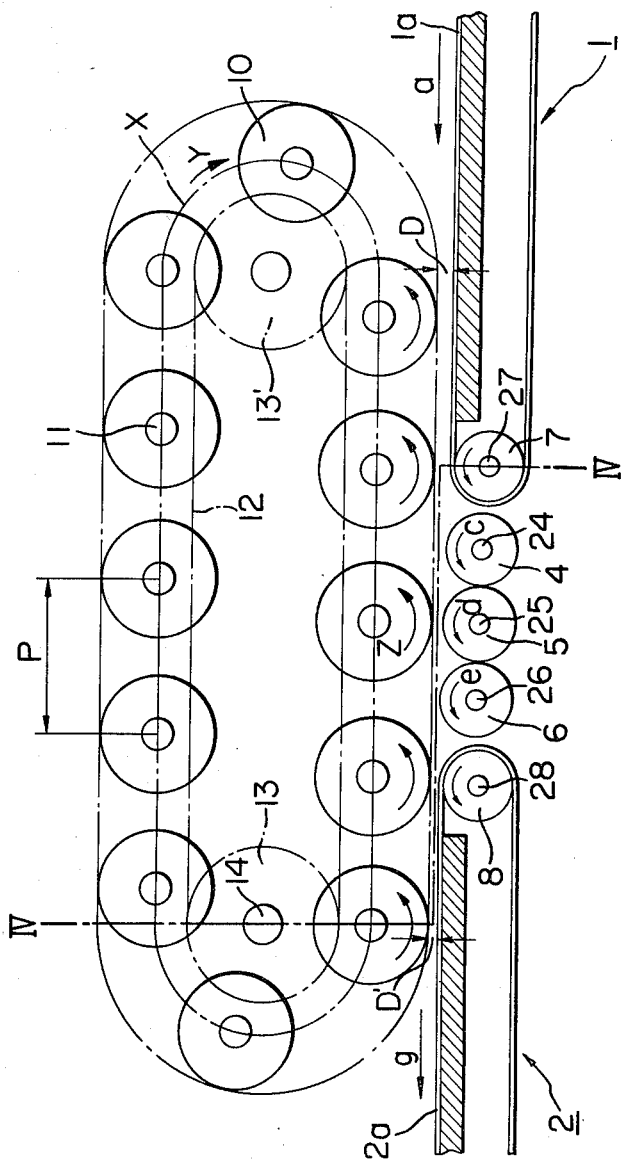
FIG. 1 is a schematic view of the overall structure of the present invention.
Figure 2:
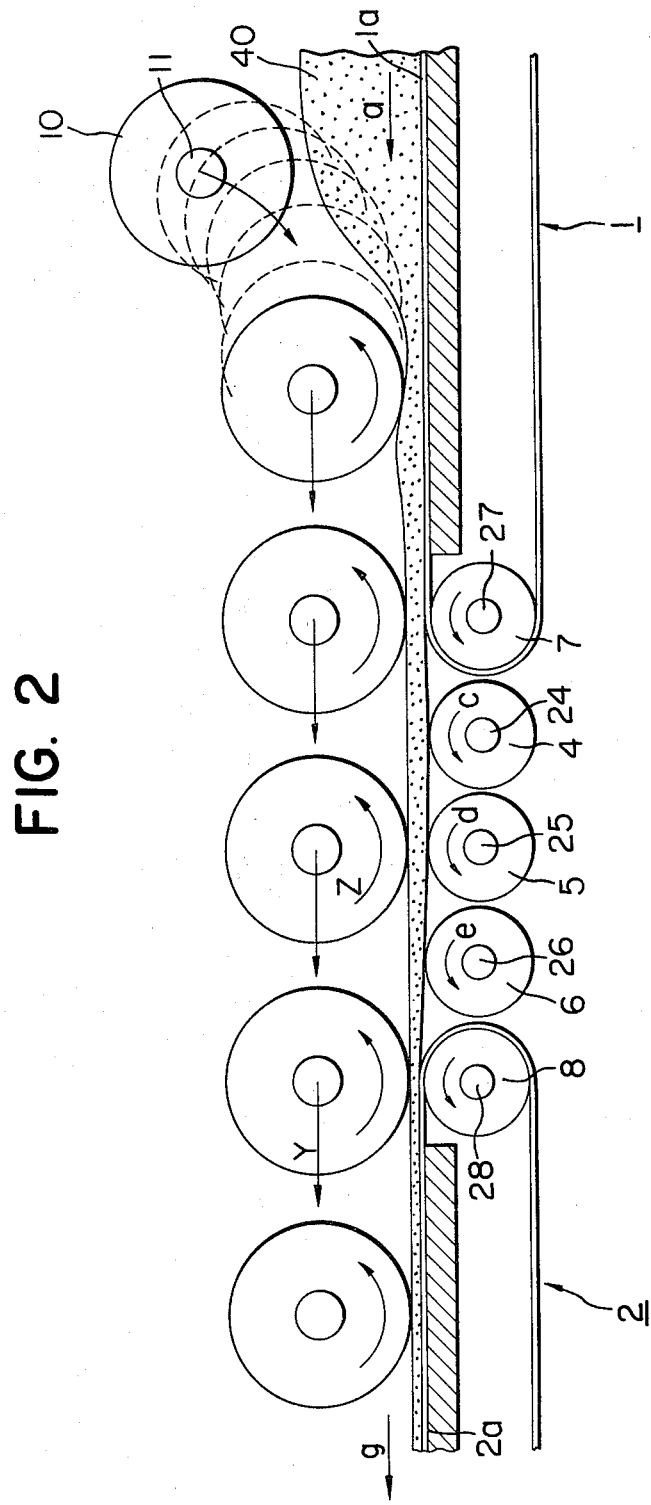
FIG. 2 is a view illustrating the operation of the present invention.

Referring now to an embodiment shown in FIGS. 1 and 2, an intake belt conveyor (1) and a discharge belt conveyor (2) are arranged horizontally and in series leaving a space between the downstream end of the intake conveyor (1) and the upstream end of the discharge conveyor (2). The belts of these conveyors are arranged to move in the directions of arrows a and g, respectively. Three rollers (4), (5) and (6) are positioned in the space between the intake conveyor and the discharge conveyor, and are rotated about their respectively fixed axes in the directions of arrows c, d and e.

The linear velocities of these elements are arranged to form a relationship: $a<c<d<e<g$, wherein g is the highest. (For simplicity, the alphabetic symbols are used herein to denote the respective velocities of the elements.) The combination of these elements forms the transport device for the dough to be stretched, and is operatively connected to a frame or base of the present apparatus.

A stretching roller device is provided above the transport device. The stretching roller device is also operatively connected to the frame or base of the present apparatus. It comprises a group of rotatable rollers (10) arranged to progress along an oval orbit X in the direction of an arrow Y. The rollers (10) are mounted around shafts (11) to permit free rotation. The distance between any pair of adjacent rollers may preferably be substantially identical. The shafts (11) are connected to a pair of chains (12), (12), which are entrained around a pair of sprockets (13) and (13') provided near the upstream end and the downstream end of the stretching roller device. The sprocket (13) is secured to an input shaft (14).

The stretching roller device is set apart from the transport device by a predetermined distance, in which the distance D in FIG. 1 shows a space between the upper surface of the upper flight of the belt (1a) of the intake conveyor (1) and the lower straight portion of the orbit X, and the distance D' shows a space between the upper surface of the upper flight of the belt (2a) of the discharge conveyor (2) and said straight portion and is substantially identical with the thickness of the dough sheet to be produced. The distance of the gap between the stretching roller device and the transport device may gradually decrease in the downstream direction such that the distance is the largest at the intake belt conveyor and is the smallest at the discharge conveyor. Further, the distance of the gap corresponds to the thickness of the dough subjected to the stretching operation, which thickness depends upon various parameters of the elements involved.

Figure 4:
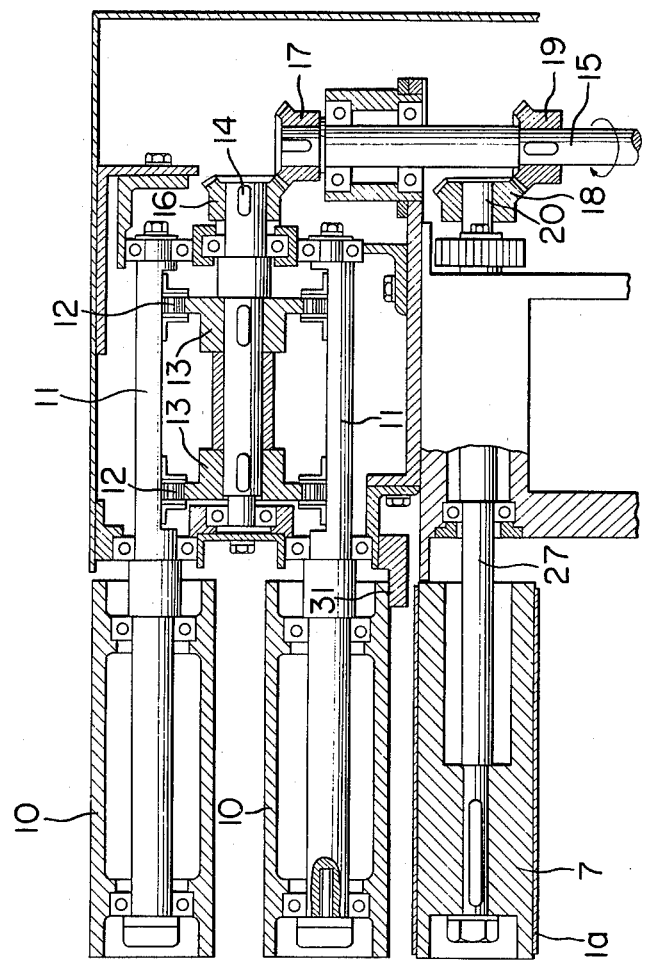
FIG. 4 is a sectional view taken along the IV—IV line in FIG. 1 for illustrating the mechanism of the stretching rollers and the rollers for driving the conveyor belts.

In FIG. 4, a drive shaft (15) is arranged to rotate the shaft (14) via meshing bevel gears (16) and (17), which are provided at the ends of the shafts (14) and (15), respectively. Thus, the rotation of the shaft (15) causes the rotation of the shaft (14), of the sprocket (13) and the revolution of the chains (12), (12), resulting in the revolution of the rollers (10) along the oval orbit X in the direction of the arrow Y (FIG. 1). The shaft (15) is also arranged to rotate a counter shaft (20) via meshing bevel gears (18) and (19), which are provided at an end of the shaft (20) and in the middle of the shaft (15), respectively.

Figure 5:
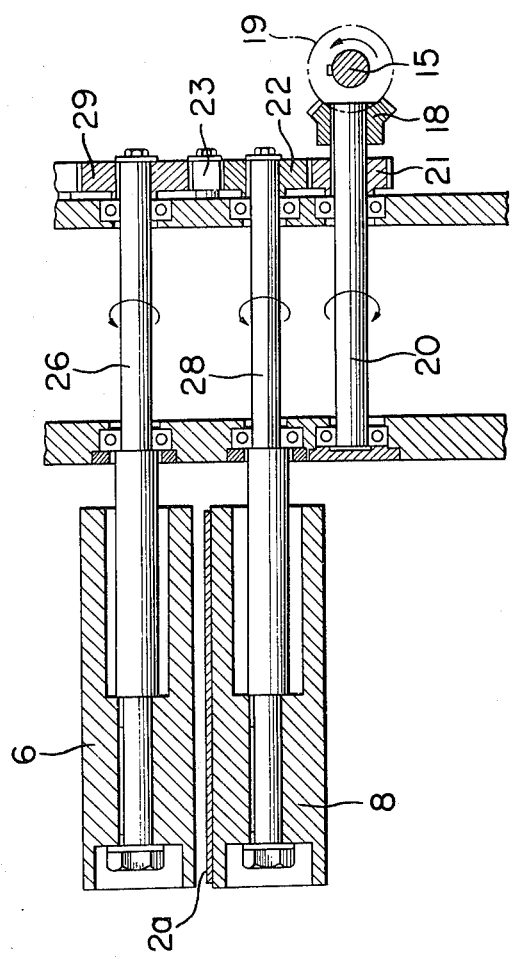
FIG. 5 is a bottom view of a portion of the device illustrating the mechanism of input power transmission to the conveyor belts and rollers.

In FIG. 5, the shaft (20) is provided with a gear (21) secured thereto, and the gear (21) engages a gear (22) which is secured to a shaft (28) around which the upstream end roller (8) for the conveyor (2) is mounted. Further, the shaft (28) is linked to a shaft (26) of the roller (6) via gears (23) and (29). Likewise, the shaft (26) is linked successively to a shaft (25) of the roller (5), a shaft (24) of the roller (4) and a shaft (27) of the downstream end roller (7) for the conveyor (1). The rotation of the shaft (15) causes the rotation of the gear (21) via the bevel gears (19), (18) and the shaft (20). The rotation of the gear (21) in turn rotates the gear (22). The gears (22), (23), (29) and so on engaging each other in series are arranged to rotate the shafts (28), (26), (25), (24) and (27) at predetermined speeds decreasing in that order. The velocity of revolution of the rollers (10) is arranged to be larger than the velocity g of the conveyor belt (2).

Figure 3:
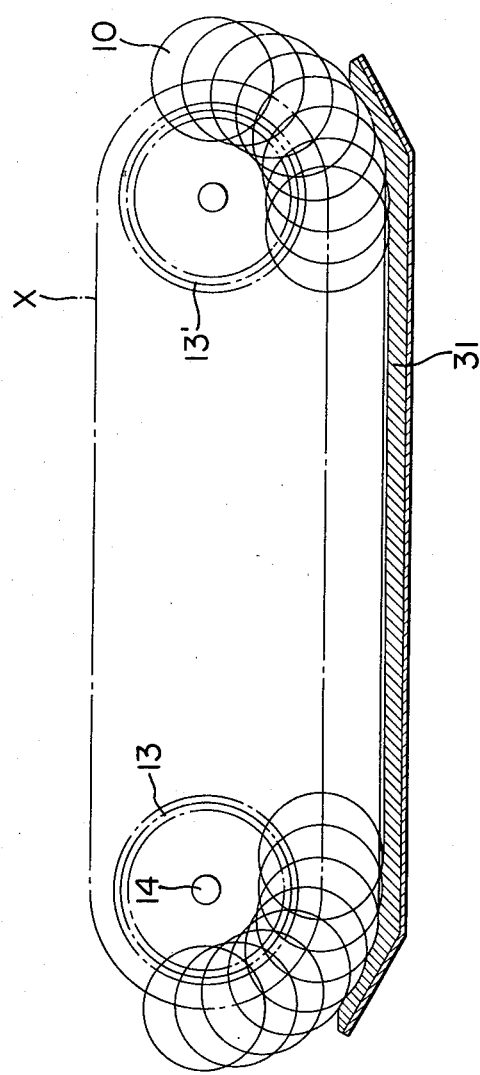
FIG. 3 is a view illustrating the operation of the friction plate in the present invention.

A revolving roller (10), when it arrives at the lower straight portion of the orbit X, comes into contact with a friction plate (31) as shown in FIGS. 3 and 4, which is secured to an appropriate portion of the frame of the present apparatus, and starts forced rotation around its own axis in the direction indicated by an arrow Z. In place of the friction plate (31), a rack gear assembly may be employed to rotate the rollers. The forced rotation of the rollers imparts on the upper surface of the dough certain pressure which contributes to making even the interior tissue of the dough. These devices, however, are not indespensable in the apparatus of the present invention.

The operation of the device of the present invention will now be described.

A strip of dough material (40) is fed onto the belt (1a) of the intake conveyor (1), and is crushed by the rollers (10) coming downward at the curved portion of the orbit X.

The rollers (10), while changing their direction of progress to the horizontal direction along the orbit, are made to rotate by the contact between themselves and the surface of the dough, and then by their contact with the friction plate (31) so as to progress on the dough (40). In case there is no friction plate (31), the rotation of the rollers (10) is always caused by their contact with the dough surface.

The dough (40) receives the initial stretching action by the rollers (10) while it is on the progressing intake conveyor belt (1a). The dough (40) leaving the intake conveyor (1) will then be received by the roller (4). The peripheral velocity of the roller (4) is arranged to be faster than the velocity of the belt (1a) of the intake conveyor (1). The roller (4) is followed by the roller (5), arranged to rotate faster than the roller (4). After a single-stage or multiple-stage relay of the above nature, the dough received by the belt (2a) of the discharge conveyor (2) is discharged therefrom and stretched to the thickness corresponding to the distance D'.

The discharge conveyor (2) is necessary in case the finished dough requires a thickness of less than about 3 mm. In case the finished dough is thicker than about 3 mm, it may be dispensed with. The lengthwise length of the upper surface of the conveyor (2) underneath the lower straight portion of the orbit is preferably greater than P which is the distance between the centers of adjacent two rollers (10). In this arrangement, at least one of the rollers (10) in operation is always positioned above the portion of the discharge conveyor (2) positioned opposite to the lower straight portion of the orbit X. This arrangement makes it possible to continuously hold the dough under a tension caused by the fact that the velocity g of the discharge conveyor (2) is the highest of that of any of the transport elements, especially higher than that of the velocity a of the intake conveyor (1). This is of significance since none of the transport rollers continuously holds the dough in coaction with the stretching rollers. Further, the dough on the discharge conveyor (2) is in continuous contact with any stretch roller coming in contact therewith during its travel along the lower straight portion of the orbit X facing the discharge conveyor (2), and this continuous contact is repeated as often as the subsequent stretch rollers appear on the portion of the dough already rolled over. The holding of the dough in tension and the rolling of the stretch rollers on the dough in repeated and continuous contact enables the dough to lose its elasticity to a substantial extent so as to deprive the dough of its tendency to restore its former thickness.

The rollers (4), (5) and (6) positioned between the two conveyors not only support and convey the dough progressing thereon, but also cooperate with the rollers (10) passing on the dough in compressing the dough (40), contributing to the predetermined stretching operation. The above compression may be similar in its nature as intermittent "beating" inflicted on the dough. Since the dough and the rollers (10) progress at different speeds, the portions of the dough beaten by the rollers (10) always vary and become evenly distributed all over the dough, whereby not only the surface of the dough are made smooth but also the elasticity of the dough material may substantially be lost to preclude recovery of thickness.

In case a very thin dough sheet is to be produced, the stretching of the dough requires the discharge conveyor, but in case the dough is intended to be stretched to a thickness of about 3 mm or more, the stretching can be satisfactorily carried out by the mere combination of the intake conveyor (1) and one or more rollers.

In the latter case, when the dough is supported by the intake conveyor (1) and the downstream rollers only, the mechanical structure of the device becomes more solid and durable because a belt conveyor presents more possibility of maintenance difficulties than rollers. Further, more rollers may be provided than the case where the device has the second conveyor (2), since the space for the second conveyor (2) may be taken over by additional rollers. In this instance, the increase in the velocity of the rollers may be carried out in more stages than the case with less rollers. This permits the opportune adjustment of the velocity of each roller such that it increases in more gentle gradients, which results in mitigating the stress on the dough (40) in the stretching and deforming operation and enables to give the device a greater stretching efficiency in terms of the ratio of thickness of the fed dough sheet to that of the obtained dough sheet.

The inventor has conducted experiments using the embodiments of the present invention, in which the straight portion of the orbit X of the rollers (10) was 500 mm. In one embodiment, the device employed comprised an intake conveyor (1), three intermediate rollers (4), (5), (6) and a discharge conveyor (2) (hereinbelow referred to as Device A). The upper portion of the belt (2a) facing the lower straight portion of the orbit X of the stretching roller device was slightly greater than the center-to-center distance P of any adjacent pair of stretching rollers (10). A white bread dough sheet of which the water content was 58 parts per 100 parts (by weight) of flour and the thickness of which was about 25 mm was stretched to a thickness of about 2 mm, the stretching efficiency being about 12.

In another embodiment, wherein the device comprised an intake conveyor (1) and six rollers but it was not provided with any discharge conveyor (2) (hereinbelow referred to as Device B), a white bread dough sheet of the same kind in the thickness of about 60 mm was stretched to a thickness of about 4 mm, the stretching efficiency being about 15. However, in the case of this device, it was not possible to stretch a dough sheet of the thickness of 25 mm to that of 2 mm. This may probably be attributed to the recovery of the thickness of the dough coming out of the device due to its elasticity. In case of Device A, however, the elasticity of the dough was substantially lost when it came out of the device. Since the length of the upper portion of the discharge conveyor belt (2a) facing the upper rollers was greater than P as described above, at least one of the rollers (10) always holds down the dough onto the upper surface of the discharge conveyor belt (2a) and this seems to cause the stretched bread dough to lose its elasticity and deprive it of its capacity to partially restore its thickness.

Similar experiments were conducted using cookie dough. With Device A the dough was effectively stretched to a thickness of 3 mm or less. Device B showed a greater stretching efficiency than Device A.

Although the preferred embodiment of the present invention has been illustrated and described, it will be apparent to those skilled in the art that various changes and alterations may be made therein without departing from the spirit of the invention and the scope of the appended claims. For instance, the number of the rollers disposed between the intake conveyor and the discharge conveyor is not limited to three as described above. One, two or more than three rollers may be provided between the conveyors according to the nature of the dough material to be stretched and the products of various kinds to be worked from the finished dough. Further, as aforementioned, a rack mechanism may be arranged to forcibly rotate the rollers (10) instead of the friction plate (31).

What is claimed is:

1. An apparatus for continuously stretching dough for cakes, bread or the like, comprising:
   (a) a plurality of rotatable stretching rollers movable in unison about an endless roller path having a lower straight portion;
   (b) means spaced below said lower straight portion fr transporting dough into engagement with those of said stretching rollers moving along said lower straight portion, said transport means including an intake conveyor belt having a portion facing said lower straight portion and at least one rotatable transport roller facing said lower straight portion and disposed in series relation downstream of said intake conveyor belt;
   (c) means operatively associated with said intake conveyor belt and each transport roller for driving them at respective speeds, said speeds being progressively faster in the downstream direction of dough transport; and
   (d) means operatively associated with said stretching rollers for moving them along said lower straight portion in the same direction as the dough transport and at a linear speed faster than the peripheral speed of any transport roller.

2. An apparatus according to claim 1, wherein said dough transport means further includes at least a portion of a discharge belt conveyor disposed downstream of the most downstream transport roller, and means operatively associated with said discharge belt for driving it at a speed faster than the peripheral speed of said most downstream transport roller and slower than the speed of revolution of said stretching rollers about said endless path.

3. An apparatus according to claim 1, comprising means for positively controlling the rotational speed of said stretching rollers at the area where said stretching rollers are to contact the dough.

4. An apparatus according to claim 2, wherein said stretching rollers are spaced apart from one another at substantially an equal distance and the portion of said discharge belt conveyor directly below said lower straight portion has in the direction of transport of dough a length equal to or longer than the center-to-center distance between any two adjacent stretching rollers.

5. An apparatus according to claim 1, said transport means including a plurality of said transport rollers.

6. An apparatus according to claim 2, comprising means for positively controlling the rotational speed of said stretching rollers at the area where said stretching rollers are to contact the dough.

* * * * *